June 8, 1948.  A. E. DEAL  2,442,889
COMBINED TRACTOR AND TRUCK BODY
Filed July 9, 1945  2 Sheets-Sheet 1

Inventor
Alvin E. Deal
By Stone, Boyden & Mack
Attorneys

June 8, 1948.　　　　　A. E. DEAL　　　　　2,442,889
COMBINED TRACTOR AND TRUCK BODY
Filed July 9, 1945　　　　　　　　　　　2 Sheets-Sheet 2
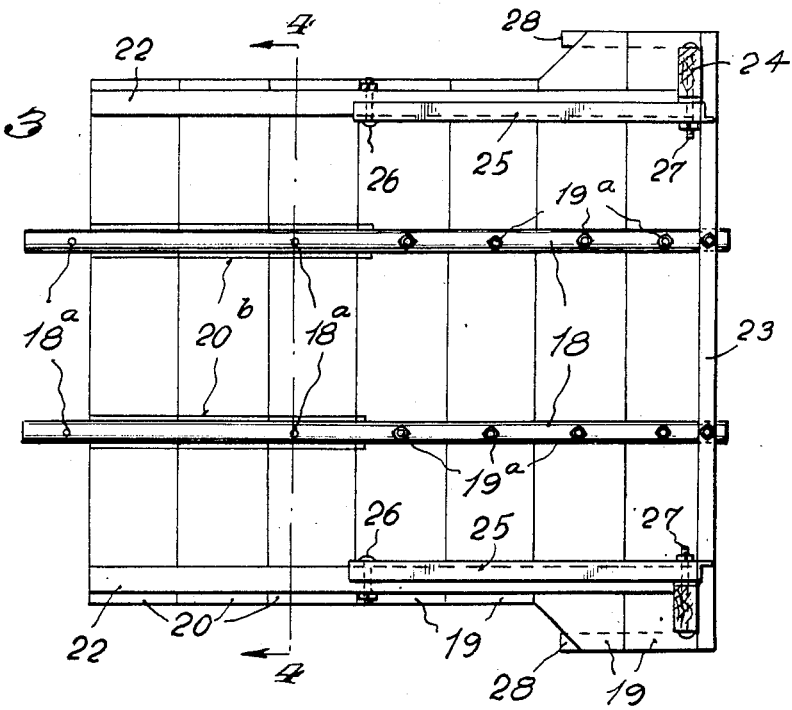
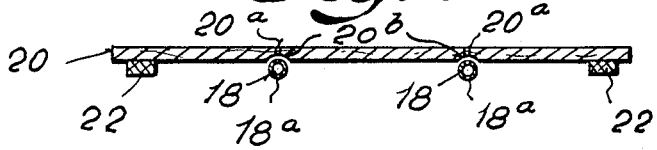
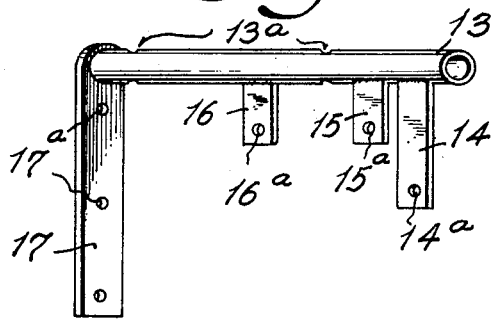
Inventor
Alvin E. Deal
By Stone, Boyden & Mack
Attorneys Patented June 8, 1948

2,442,889

UNITED STATES PATENT OFFICE 2,442,889

COMBINED TRACTOR AND TRUCK BODY

Alvin E. Deal, Morrisonville, Ill.

Application July 9, 1945, Serial No. 603,909

5 Claims. (Cl. 296—28)

This invention relates in general to the combination of a tractor and a truck body therefor. More specifically, the combination pertains to the details whereby a platform body is mounted on a tractor chassis.

One feature of the invention is the provision of a quick detachable body which is adapted to have a sliding engagement with a supplemental frame mounted on a tractor chassis.

Another feature of the invention relates to the details of the supplemental frame whereby a truck body is mounted on a tractor chassis, and the location and relative position of the frame braces whereby it may be secured by means of the standard bolts and flanges of a tractor chassis.

The above and additional features and advantages of the invention will be apparent from the following specification and claims, considered in view of the accompanying drawings in which:

Fig. 3 is a view of the bottom of the truck body, removed from the tractor;

Fig. 4 is a cross-sectional view taken on the line 4—4 of Fig. 3 and looking in the direction of the arrows; and Fig. 5 is a perspective view of one of the frames adapted to be carried by a tractor chassis for the detachable reception of the body shown in Fig. 3.

Referring in detail to the several figures of the drawings, 1 identifies the engine hood of a tractor. 2 are the front wheels and 3 indicates the right rear wheel. The steering wheel is shown at 4, and 5 is the driver's seat. The differential gear housing is shown conventionally at 6 as centrally located between rear axle housings 7. The axle housings 7 are secured to the opposite sides of the differential housing 6, according to common practice, the axle housings having flanges 8 which are bolted to the opposite side faces of the differential housing 6 and are secured by means of bolts or screws 9.

Figure 1:
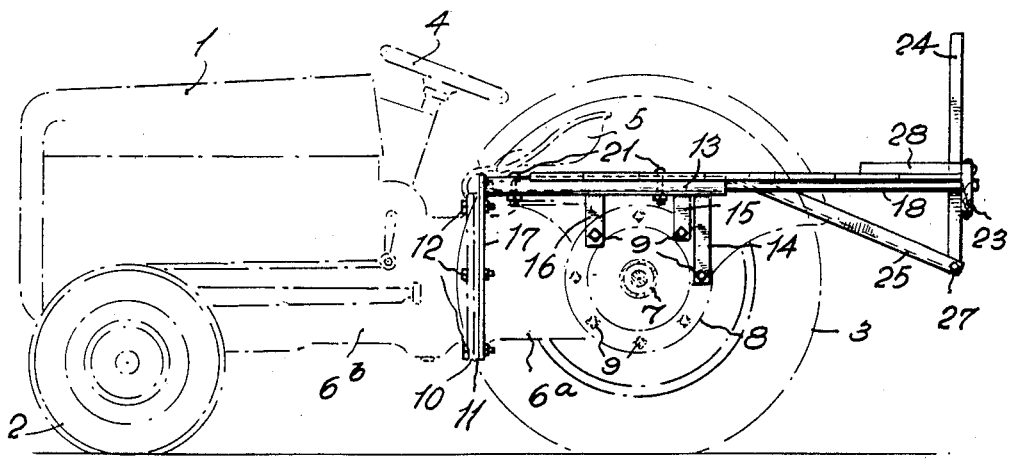
Fig. 1 is a side elevation of the combined tractor and truck body, the left rear wheel and part of the left rear axle having been removed to illustrate the mounting of the truck body.
Figure 2:
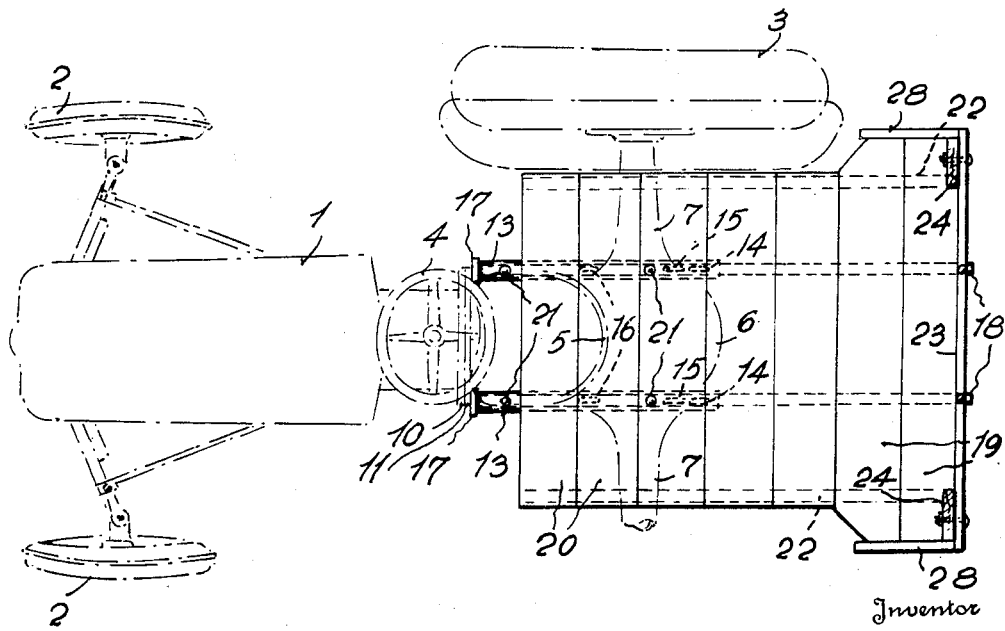
Fig. 2 is a plan view of the tractor and truck body shown in Fig. 1.

The tractor chassis illustrated in Figs. 1 and 2 is of the type which has a gear box and a housing extending from the hood rearwardly to the differential housing. This housing is of sufficient width and height to provide strength for the chassis. Also the chassis shown in Figs. 1 and 2 is provided with a flanged union having a forward flange 10 and a rearward flange 11 which are secured together by fastening bolts or screws 12.

The abutting faces of the flanges and the flanges themselves lie in a vertical plane which extends parallel to the line of the rear axle and is located just forwardly of the driver's seat. The flanged union projects laterally and outwardly from the adjacent wall of the gear box or casing of the chassis. That portion of the casing extending immediately forward from the differential housing is indicated at 6a. The flange 11 is a unitary part of the casing portion 6a. The flange 10 is the unitary part of a casing portion 6b which may be identified as a gear box or other housing located immediately to the rear of the engine crank case.

Thus far the description has related to a standard type of tractor. The present invention includes a quick detachable truck body for a tractor; also to the combination of the body and the tractor, and also to the particular construction of the frame whereby the truck body can be installed on a tractor and also to the details by which the frame is firmly secured to the tractor. The details of the frame will now be described.

The frame consists of two tubular pieces 13 which are spaced apart and mounted in a horizontal and parallel position substantially directly above the side walls of the tractor differential casing 6 and the flanges 8, as will be explained. Extending downwardly from the lower side and rear portion of the tubular pieces 13 are a plurality of short flat bars 14, 15 and 16, shown as having width greater than their thickness, the upper ends of which bars are welded to the under-surface of the tubes 13. Their broader surfaces face axially. These bars 14, 15 and 16 constitute brace members and each of them is provided with openings, respectively, 14a, 15a and 16a which extend horizontally and axially and in a direction transversely to the length of the frame members 13. By reference to Fig. 1, it will be observed that the bars 14, 15 and 16 of the left tubular piece 13 are secured to the face of the flange 8 on the left side of the differential casing 6 by means of the fastening bolts 9 which normally otherwise would secure the axle flange to the face of the differential casing. According to the present invention, the bolts 9 extend through the bars or braces 14, 15 and 16 and serve the dual purpose of holding those bars and the axle to the differential. It will be observed that the rearmost bar or brace 14 is longer than the other two and projects about halfway down the height of the flange 8, also the next brace 15 is slightly shorter and is adapted to be secured by the next adjacent fastening bolt 9. It will also be observed that the next forward brace 16 is adapted to be fastened by one of the bolts 9 on the forward side of the flange 8. This structure is duplicated at the right side of the tractor. It will also be observed that the lower ends of the braces 14, 15 and 16, in which the holes 14a, 15a and 16a for the bolts are located, are in a common vertical plane at either side of the rear axle flanges 8, whereby their innermost faces may be secured to the outer face of the axle flanges 8.

At the extreme forward end of each tube 13 is a flat plate 17 which is welded to and across the forward end of the tube 13. 17 extends downwardly and is provided with holes 17a whereby 17 may be secured to the rear face of the flange 11 by the bolts 12. It will be noted that in this position the plate 17, like the flanges 10 and 11, extends vertically and the face of the plate 17 is in a plane parallel to the line of the rear axle. This arrangement provides a rigid and strong mounting for the tube 13. As explained hereinbefore, there are two of these tubes similarly mounted one at each side of the tractor casing.

The tractor is now equipped to receive the detachable body which is shown installed in Figs. 1 and 2 and in the removed position in Fig. 3. The quick detachable body includes two beams 18 which are spaced apart the same distance at which the tubes 13 are spaced apart. Preferably the beams 18 are the same cross-sectional shape as the interior or bore of the tubes 13 so that the beams 18 may be slidably inserted into the rear ends of the tubes 13. In practice, it is expedient to form the beams 18 of slightly smaller cross-section than the cross-section of the tubes 13 so that they may be fitted together by inserting the members 18 telescopically into the members 13. The floor boards of the tractor body are shown as extending across the body, and axially. The floor boards are of two different groups. Those boards toward the rear are indicated at 19 and are secured to the beams 18 by means of bolts 19a extending through the boards 19 and through the beams 18. A forward group of boards are indicated at 20 and have no direct connection to the beams 18. These forward boards are peculiar in that they are cut away next adjacent the beams 18 to provide a space 20b between the boards and the beams 18 for the reception of the tubes 13 when the body is mounted on the tubes 13. When the mounting is effected, the beams 18 are thrust into the rear ends of the tubes 13 and the tubes 13 occupy the enlarged spaces 20b in the boards 20. Thereupon fastening bolts 21 are inserted through the holes 13a in the tubes and through the holes 18a in the beams 18 forwardly of the boards 20. Another set of bolts 21 are inserted through holes 20a in one of the boards 20 and then through the tubes 13 and beams 18 at a location above the rear axle.

The truck body is provided with side sills 22 which extend from front to rear and to which the boards 19 and 20 are secured. Across the rear of the body is an end board 23 which serves to strengthen the truck body. When the body is used for the mounting of farm machinery, such as seeding apparatus, it is convenient to have rear corner posts and these are indicated at 24, one at each rear corner of the truck body. The corner posts 24 may be bolted to the end board 23 and the lower ends of the posts 24 may be provided with braces 25, the forward ends of which are shown as bolted at 26 to the side sills 22 and the rear ends of which are secured to the posts 24 by bolts 27. As shown in Figs. 1, 2 and 3, the rearmost several boards of the body are extended laterally to provide extra width rearwardly of the rear wheels. To strengthen this broader portion of the truck, supplemental side sills are indicated at 28.

It will be apparent that the construction described in the foregoing is both light and strong. The use of metal tubes in the frame work provides strength. Rigidity as well as strength is insured by the mounting of the plurality of plates 14, 15 and 16 secured to the differential; and the positioning of the forward brace 17 in a plane at right angles to the length of the tube and at right angles to the position of the braces 14, 15 and 16 insures both strength and rigidity.

When the body is in position on the tractor, the combination may be used as a delivery truck which is capable of carrying a load under conditions which only a tractor can negotiate. The combination makes it unnecessary for the farmer to have both a truck or wagon and tractor as a plurality of vehicles. The combined tractor with its body serves conveniently in lieu of such a plurality.

It will be obvious to those who are familiar with the type of tractor illustrated that the usual draw bar and tool attachments may be left in place on the tractor if they do not extend upwardly so far as to interfere with the detachable body. Mounted tools or implements which must be removed when the detachable body is placed in position can again be mounted on the tractor after the body is removed. In short, the temporary addition of the body does not limit subsequent use of the usual tractor attachments.

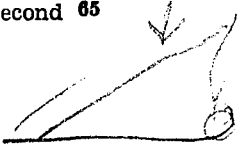

I claim:

1. A frame and detachable truck body for mounting on a motor vehicle chassis comprising two tubular main frame members positioned alongside of each other and adapted to be mounted lengthwise of a chassis and above it, a forward brace element at the forward end of each frame member and extending downwardly therefrom, and having holes therethrough for the reception of fastening bolts, said holes extending in a direction substantially parallel to the length of said frame members, a rear brace element extending downwardly from each of said frame members at positions rearwardly of said forward brace elements and having holes therethrough for the reception of fastening bolts, said latter holes extending in a direction transversely to the direction of the length of said frame members, and a body portion having two spaced supporting beams, each of which is adapted to fit slidably and removably in said tubular frame members and having floor members supported by said beams.

2. A frame and detachable truck body for mounting on a motor vehicle chassis comprising two tubular main frame members positioned in spaced relation alongside of each other and adapted to be mounted lengthwise of a chassis and above it, a forward brace element at the forward end of each frame member and extending downwardly therefrom and having a flat face secured to the forward end edge of its respective tubular frame member and each brace element having holes therethrough for the reception of fastening bolts, said holes extending in a direction substantially parallel to the length of said frame members, a rear brace element rigidly fastened to and extending downwardly from each of said frame members at positions rearwardly of said forward brace elements, and having holes therethrough for the reception of fastening bolts, said latter holes extending in a direction transversely to the direction of the length of said frame members, and a body portion having two spaced supporting beams, each of which is adapted to fit slidably and removably in said tubular frame members and having floor members supported by said beams.

3. A frame and detachable truck body for mounting on a motor vehicle chassis comprising two tubular main frame members positioned in spaced relation alongside of each other and adapted to be mounted lengthwise of a chassis and above it, a forward brace element at the forward end of each frame member and extending downwardly therefrom and having a flat face secured to the forward end edge of its respective tubular frame member and each brace element having holes therethrough for the reception of fastening bolts, said holes extending in a direction substantially parallel to the length of said frame members, two rear brace elements, each of different length, rigidly fastened to and extending downwardly from each of said frame members at positions rearwardly of said forward brace elements, and having holes therethrough for the reception of fastening bolts, said latter holes extending in a direction transversely to the direction of the length of said frame members, and a body portion having two spaced supporting beams, each of which is adapted to fit slidably and removably in said tubular frame members and having floor members supported by said beams.

4. The combination of a motorized chassis, a truck body and fastening means therefor, comprising in the chassis a rear axle differential housing having a central hub portion and rear axle housings having flanges secured to the opposite sides thereof, and a first set of fastening bolts extending axially through said flanges and secured to said central hub portion, said chassis having also a flanged union located on opposite sides of a housing forwardly of said differential housing and which flanged union has an upright face extending parallel to the line of the rear axle housings, and a second set of fastening bolts extending through said face and securing said flanged union, and said combination having in said truck body and fastening means a frame for mounting the body on the chassis comprising two tubular main frame members spaced from each other and adapted to be positioned lengthwise of the chassis and above it, a forward brace element at the forward portion of each frame member and extending downwardly therefrom and secured to said face of said flanged union by said first set of fastening bolts, and a rear brace element extending downwardly from each of said frame members at a position rearwardly of said forward brace elements and secured to said rear axle housing flanges of said chassis by said second set of bolts, and a body portion having two spaced supporting beams, each of which is adapted to fit slidably and removably in said tubular frame members and having floor members supported by said beams.

5. The combination of a motorized chassis, a truck body and fastening means therefor, comprising in the chassis a rear axle differential housing having a central hub portion and rear axle housings having flanges secured to the opposite sides thereof, said chassis also having a flanged union located on opposite sides of the housing forwardly of said differential housing and which flanged union has an upright face extending parallel to the line of the rear axle housings, said combination including in association with said truck body and fastening means a frame for mounting the body on the chassis comprising two tubular main frame members spaced from each other and adapted to be positioned lengthwise of the chassis and above it, a forward brace element at the forward end of each frame member and extending downwardly therefrom and having a flat face secured to the forward end edge of its respective tubular frame member and each brace having holes therethrough for the reception of fastening bolts, said holes extending in a direction substantially parallel to the length of said frame members, a rear brace element rigidly secured to and extending downwardly from each of said frame members at positions rearwardly of said forward brace elements and having holes therethrough for the reception of fastening bolts, said latter holes extending in a direction transversely to the direction of the length of said frame members, a first set of fastening bolts extending through the openings in said rear brace element and axially through said flanges of said rear axle housings and secured to said central hub portion of the rear axle differential housing, a second set of fastening bolts extending through said forward brace element and serving to secure said flanged union, and a body portion having two spaced supporting beams, each of which is adapted to fit slidably and removably in said tubular frame members and having floor members supported by said beams.

ALVIN E. DEAL.

REFERENCES CITED

The following references are of record in the file of this patent:

UNITED STATES PATENTS

| Number | Name | Date |
| --- | --- | --- |
| Re. 17,209 | Oechsle | Feb. 5, 1929 |
| 1,270,086 | Wochner | June 18, 1918 |
| 1,366,771 | Devencenzi | Jan. 25, 1921 |
| 1,372,396 | Blackburn | Mar. 22, 1921 |
| 1,409,043 | Trahan | Mar. 7, 1922 |
| 1,650,757 | Kraus | Nov. 29, 1927 |
| 1,772,071 | Davey | Aug. 5, 1930 |
| 1,773,496 | Osman | Aug. 19, 1930 |
| 2,052,303 | Johnston et al. | Aug. 25, 1936 |